(12) United States Patent
Ekblom et al.

(10) Patent No.: US 8,410,204 B2
(45) Date of Patent: Apr. 2, 2013

(54) HARDENER COMPOSITION, ADHESIVE SYSTEM AND METHOD OF GLUING

(75) Inventors: Hans Ekblom, Handen (SE); Sara Fäldt, Stockholm (SE); Ingvar Lindh, Bromma (SE); Benyahia Nasli-Bakir, Saltsjö-boo (SE)

(73) Assignee: Akzo Nobel Coatings International B.V., Arnhem (NL)

( * ) Notice: Subject to any disclaimer, the term of this patent is extended or adjusted under 35 U.S.C. 154(b) by 376 days.

(21) Appl. No.: 12/667,815

(22) PCT Filed: Jun. 27, 2008

(86) PCT No.: PCT/SE2008/050791
§ 371 (c)(1), (2), (4) Date: Mar. 16, 2010

(87) PCT Pub. No.: WO2009/005461
PCT Pub. Date: Jan. 8, 2009

(65) Prior Publication Data
US 2010/0326597 A1    Dec. 30, 2010

Related U.S. Application Data

(60) Provisional application No. 60/958,339, filed on Jul. 5, 2007.

(30) Foreign Application Priority Data

Jul. 5, 2007    (EP) .................................... 07111807

(51) Int. Cl.
C08K 5/00    (2006.01)
C08L 29/04    (2006.01)

(52) U.S. Cl. ....................................... 524/284; 524/503

(58) Field of Classification Search .................. 524/284
See application file for complete search history.

(56) References Cited

U.S. PATENT DOCUMENTS

| 3,640,735 | A | | 2/1972 | Oppenheimer et al. |
| 4,569,971 | A | * | 2/1986 | Sasse et al. .................. 525/109 |
| 5,199,465 | A | | 4/1993 | Stiem |
| 6,436,865 | B1 | | 8/2002 | Berube et al. |
| 6,653,392 | B2 | * | 11/2003 | Nasli-Bakir et al. .......... 524/512 |
| 6,734,275 | B2 | * | 5/2004 | Pirhonen et al. ............. 528/129 |
| 2003/0209319 | A1 | | 11/2003 | Almqvist |
| 2006/0276570 | A1 | | 12/2006 | Grigsby et al. |

FOREIGN PATENT DOCUMENTS

| CA | 2485269 | 10/2003 |
| EP | 0374624 | 6/1990 |
| EP | 1095955 | 5/2001 |
| GB | 1081413 | 8/1967 |
| GB | 1287286 | 8/1972 |
| JP | 53-046302 | 4/1978 |
| JP | 61-106616 | 5/1986 |
| JP | 63-168479 | 7/1988 |
| JP | 01-229085 | 9/1989 |
| JP | 01229085 A * | 9/1989 |
| JP | 08-041437 | 2/1996 |
| JP | 11079926 | 3/1999 |
| JP | 2000-239307 | 9/2000 |
| JP | 2003100676 | 4/2003 |
| KR | 20020035372 | 5/2002 |
| SE | 429136 | 8/1983 |
| WO | WO 89/05221 | 6/1989 |
| WO | WO 01/70898 | 9/2001 |
| WO | WO 03/086750 | 10/2003 |
| WO | WO 2004076734 | 9/2004 |
| WO | WO 2005/010119 | 2/2005 |

OTHER PUBLICATIONS

International Search Report and Written Opinion, International Application No. PCT/SE2008/050791, mailed Oct. 27, 2008.
Response to Written Opinion, International Application No. PCT/SE2008/050791, dated Mar. 26, 2009.
International Preliminary Report on Patentability, International Application No. PCT/SE2008/050791, mailed Jun. 24, 2009.

* cited by examiner

*Primary Examiner* — Hui Chin
(74) *Attorney, Agent, or Firm* — Kenyon & Kenyon LLP

(57) ABSTRACT

The invention relates to a hardener composition for use in an amino resin based adhesive system, comprising an aliphatic alpha hydroxy- mono-, or di-, carboxylic acid, and polyvinyl alcohol. It also relates to an adhesive system and a method of gluing wooden materials.

5 Claims, No Drawings

HARDENER COMPOSITION, ADHESIVE SYSTEM AND METHOD OF GLUING

REFERENCE TO RELATED APPLICATION(s)

This application is the U.S. National Phase of PCT/SE2008/050791 filed on Jun. 27, 2008 and claims the benefit of U.S. Provisional Application No. 60/658,339 filed on Jul. 5, 2007.

The present invention relates to a hardener composition, an adhesive system and a method of gluing wooden materials.

BACKGROUND

When producing laminated beams melamine-based amino resins, usually melamine-formaldehyde- (MF) and melamine-urea-formaldehyde (MUF) resins, are commonly used. These amino resins give light-coloured joints in contrast to phenolic-based resins such as phenol-formaldehyde- or phenol-resorcinol-formaldehyde resins. UF resins are not suitable for use when making laminated beams due to their low water resistance. As curing agent for an MF or MUF resin an acid is used. The most commonly used acid when producing laminated beams is formic acid, or another volatile acid, for example acetic acid. Formic acid gives good bonding results but negative side-effects to the working environment and increasing corrosion on the gluing equipment. Non-volatile acids which give sufficient curing rate (e.g. para-toluenesulfonic acid (PTSA) and maleic acid) are quite strong acids which increases the risk of acid damage to the wood surface and gives poor stability of hardener compositions also containing polymer dispersions.

When gluing laminated beams at low temperatures and low humidity in the air, there has been seen a problem with sufficient bond quality when using state of the art adhesive systems using formic acid as the curing agent.

It would be desirable to provide a hardener composition which does not create the problems to the working environment as volatile acids do. Furthermore, it would be desirable to provide a hardener composition, and an adhesive system, which give improved results in terms of gluing quality, when used in low temperature, low humidity environments.

WO 01/70898 A1 discloses an adhesive system comprising an etherified amino resin, a carboxylic acid, polyvinyl acetate and polyvinyl alcohol.

U.S. Pat. No. 6,436,865 discloses a liquid catalyst for crosslinking with amino resins.

WO 2005/010119 discloses an adhesive composition comprising an amino resin and an acid with a pKa lower than 6.

It is an object of the present invention to provide a hardener composition which in combination with an amino resin, in particular melamine-formaldehyde- or melamine-urea formaldehyde resins, provides an adhesive system which when used in wood gluing methods, preferably when producing laminated beams, gives a strong adhesive bond, e.g., measured as fiber tear and delamination, and no or low acid damage on wood surfaces, and possibility of long assembly time. The hardener composition should furthermore not create the problems with corrosion and the problems to the working environment, as volatile acids do. The hardener composition should also preferably be storage stable.

THE INVENTION

By the term "adhesive system", as used herein, is meant a combination of a curable resin and a hardener for curing the resin.

By "dry content" is herein meant the content of all components except water.

The present invention comprises a hardener composition for use in an amino resin based adhesive system, comprising from about 1 to about 50 weight-% of an aliphatic alpha hydroxy-mono-, or di-, carboxylic acid, and polyvinyl alcohol.

The present invention further comprises an adhesive system comprising a resin component which is an amino resin and a hardener component which is an aliphatic alpha hydroxy-mono-, or di-, carboxylic acid, and polyvinyl alcohol.

The present invention further comprises the use of a hardener composition according to the invention for curing an amino resin.

The present invention further comprises the use of the adhesive system according to the invention for gluing wooden materials.

The present invention further comprises a method of gluing wooden materials comprising applying an adhesive system onto at least one of two pieces of a wooden material, contacting the two pieces thereby forming an assembly with the adhesive system situated between the pieces forming a glue line, pressing the assembly, so that the pieces are joined, wherein the adhesive system comprises a resin component which is an amino resin and a hardener component which is an aliphatic alpha hydroxy-mono-, or di-, carboxylic acid, and polyvinyl alcohol. The pressing is optionally made at elevated temperature within the glue line.

In one embodiment, the adhesive system is an adhesive composition comprising an amino resin, an aliphatic alpha hydroxy-mono-, or di-, carboxylic acid, and polyvinyl alcohol.

In one embodiment, the adhesive system comprises the resin component comprising the amino resin and the hardener composition as separate parts, intended for combined use, e.g. by mixing them before application onto a surface to be glued, or by applying them separately onto a surface to be glued, or by applying them separately onto to different surfaces to be glued together.

The aliphatic chain in the acid is preferably a $C_1$-$C_2$ aliphatic chain.

The acid has suitably a solubility in water of at least 5 g/100 g water at 25° C., preferably at least 10 g/100 g water at 25° C., more preferably at least 25 g/100 g water at 25° C., most preferably at least 50 g/100 g water at 25° C.

The acid has suitably a molecular weight of less than about 160 g/mol, preferably less than about 140 g/mol.

The vapour pressure of the acid is suitably less than 10 mm Hg at 25° C., preferably less than 5 mm Hg at 25° C., most preferably less than 1 mm Hg at 25° C.

The acid suitably belongs to the group of glycolic acid, lactic acid, malic acid and tartaric acid, preferably glycolic acid and malic acid, most preferably the acid is glycolic acid.

The content of the acid in the hardener composition is suitably from about 2 to about 30 weight %, most preferably from about 5 to about 15 weight %.

The content of the acid in the adhesive composition is suitably from about 0.5 to about 15 weight %, preferably from about 1 to about 10 weight %, most preferably from about 1.5 to about 5 weight %.

The weight ratio acid to amino resin in the adhesive system is suitably from about 0.01 to about 1, preferably from about 0.02 to about 0.75, more preferably from about 0.05 to about 0.5, most preferably from about 0.1 to about 0.25.

The pH of the hardener composition is suitably from about 0 to about 4, preferably from about 0.5 to about 3, most preferably from about 1 to about 2.

The pH of the adhesive composition, or the adhesive system after having combined the amino resin and the hardener component, is suitably from about 0 to about 5, preferably from about 0.5 to about 4, most preferably from about 1 to about 2.

The polyvinyl alcohol suitably has a degree of hydrolysis of >25%, preferably >50%, most preferably >75%.

The weight average molecular weight of the polyvinyl alcohol is suitably from about 1.000 to about 200.000 g/mol, preferably from about 5.000 to about 150.000 g/mol, most preferably from about 10.000 to about 120.000 g/mol The total content of polyvinyl alcohol in the hardener composition is suitably from about 0.5 to about 25 weight %, preferably from about 1 to about 20 weight %, more preferably from about 2 to about 15 weight %, most preferably from about 3 to about 10 weight %.

The total content of polyvinyl alcohol in the adhesive composition is suitably from about 0.1 to about 15 weight %, preferably from about 0.5 to about 10 weight %, most preferably from about 1 to about 5 weight %.

In one embodiment, the hardener composition and the adhesive composition preferably further comprises a polymer of one or more ethylenically unsaturated monomers. Examples of suitable ethylenically unsaturated monomers are vinylic monomers, such as vinyl esters, e.g., vinyl acetate, vinyl propionate, vinyl butyrate and comonomers thereof with, e.g., ethylene; alkyl esters of acrylic and methacrylic acid such as methyl acrylate, methyl methacrylate, ethyl acrylate, n-butyl acrylate, etc.; butadiene-styrene and derivates thereof, such as carboxylated butadiene-styrene; substituted or unsubstituted mono- and dialkyl esters of alpha, beta-unsaturated dicarboxylic acids such as the substituted and unsubstituted mono- and dibutyl, mono- and diethyl maleate esters as well as the corresponding fumarates, itaconates and citronates; alpha beta-unsaturated carboxylic acids such as crotonic, acrylic and methacrylic acids and mixtures thereof. Polymers based on vinyl acetate are preferred. Preferably, the polymer is prepared from a monomer mixture comprising at least 50 weight % of vinyl acetate, based on the total weight of the monomers.

In one embodiment, the hardener composition and the adhesive composition preferably further comprises a divalent or trivalent alcohol. Suitable alcohols are monoethyleneglycol, monopropyleneglycol, diethyleneglycol, dipropyleneglycol, 1,4-butanediol and glycerol, preferably glycerol. The presence of such alcohol provides for e.g. improved assembly times.

The amount of the alcohol in the hardener composition is suitably from about 1 to about 40 weight %, preferably from about 5 to about 35 weight %, most preferably from about 10 to about 30 weight %.

The amount of the alcohol in the adhesive composition is suitably from about 0.5 to about 25 weight %, preferably from about 1 to about 20 weight %, most preferably from about 2 to about 15 weight %.

According to one embodiment of the invention the polymer of one or more ethylenically unsaturated monomers comprises post-crosslinking groups. The post-crosslinking groups can be incorporated into the polymer by co-polymerising one or more ethylenically unsaturated monomers with at least one monomer comprising at least one post-crosslinking group, forming a co-polymer. Suitable post-crosslinking groups include N-alkylol, N-alkoxymethyl, carboxylate and glycidyl groups.

By post-crosslinking monomer is herein meant a monomer having a first reactive functional group that renders the monomer co-polymerisable with ethylenically unsaturated co-monomer(s) and a second functional group that does not enter into the copolymerisation reaction during formation of the polymer, but provides a reactive site on the copolymer that may subsequently be reacted under, for example, acidic conditions, with another reactive site on the copolymer and/or the amino resin to crosslink the copolymer and/or the amino resin.

Suitable post-crosslinking monomers include, N-alkylol acrylamides, e.g., N-methylol acrylamide, N-ethanol acrylamide, N-propanol acrylamide, N-methylol methacrylamide, N-ethanol methacrylamide, N-propanol methacrylamide, N-methylol maleamide, N-methylol maleamic acid, N-methylol maleamic acid esters; the N-alkylol amides of the vinyl aromatic acids, such as N-methylol-p-vinylbenzamide and the like; also N-(alkoxymethyl) acrylates and methacrylates, where the alkyl group has from 1-8 carbon atoms, such as N-(methoxymethyl) acrylamide, N-(butoxymethyl) acrylamide, N-(methoxymethyl) methacrylamide, N-(butoxymethyl) allyl carbamate and N-(methoxymethyl) allyl carbamate, and mixtures of these monomers with allyl carbamate, acrylamide or methacrylamide; and also triallyl cyanurate. Preferably N-methylol acrylamide, or N-(butoxymethyl) acrylamide is used.

The polymer of one or more ethylenically unsaturated monomers is suitably prepared from about 0.1 to about 10 weight % and preferably from about 0.2 to about 6 weight % post-crosslinking monomer, based on the total weight of the monomers.

In one embodiment the co-polymer is based on vinyl acetate and N-methylol acrylamide.

The amount of the polymer of one or more ethylenically unsaturated monomers in the hardener composition is suitably from about 1 to about 30 weight %, preferably from about 5 to about 25 weight %, most preferably from about 10 to about 20 weight %.

The amount of the polymer of one or more ethylenically unsaturated monomers in the adhesive composition is suitably from about 0.5 to about 20 weight %, preferably from about 1 to about 15 weight %, most preferably from about 2 to about 10 weight %.

Mixtures of polymers of one or more ethylenically unsaturated monomers containing post-crosslinking groups and polymers of one or more ethylenically unsaturated monomers without post-crosslinking groups may also be used according to the invention. For example, the polymer may comprise both polyvinyl acetate without post-crosslinking groups and vinyl acetate based polymer containing post-crosslinking groups.

Preferably the polymer of one or more ethylenically unsaturated monomers according to the invention is used in a form of an aqueous dispersion.

If polyvinyl alcohol is present as an additional component of the dispersion of the polymer of one or more ethylenically unsaturated monomers, this amount is to be added to the amount of polyvinyl alcohol already present in the hardener composition and the adhesive composition and is thus included in the term "content of polyvinyl alcohol" already specified.

The viscosity (Brookfield, 12 rpm, spindle 3, at 20° C.) of the hardener composition is suitably from about 500 to about 15,000 mPa*s, preferably from about 1,000 to about 10,000 mPa*s, most preferably from about 1,500 to about 5,000 mPa*s.

The component comprising the amino resin being part of an adhesive system as a separate component, and/or to be used in a separate application method, suitably has a content of amino resin being from about 20 to about 80 weight %, preferably from about 35 to about 75 weight %, most preferably from about 50 to about 70 weight %.

The amino resin is preferably a melamine-formaldehyde- or a melamine-urea-formaldehyde resin.

In one embodiment of the method of gluing wood based materials the adhesive system is applied onto a wooden surface as the adhesive composition.

In one embodiment, the adhesive system comprises the amino resin and the hardener composition as separate components, intended for combined use in methods of gluing wooden materials.

In one embodiment, the method comprises separate application onto a wooden surface of one component comprising the amino resin and another component which is the hardener composition. The application of the two components may occur in any order or simultaneously. Furthermore, the component comprising the amino resin may be applied onto a first surface of a wooden material and the component being the hardener composition may be applied onto a second surface of a wooden material whereafter the two surfaces with applied components are joined.

The ratio of applied component comprising the amino resin and hardener composition is suitably from about 50:1 to about 1:6, preferably from about 20:1 to about 1:4, more preferably from about 10:1 to about 1:3, most preferably from about 5:1 to about 1:2.

In one embodiment of the method the adhesive system is applied onto a wooden surface as separate components, wherein one component is the amino resin, another component is the acid, and another component is the polyvinyl alcohol. The possible polymer of one or more ethylenically unsaturated monomers is used and/or polyol is/are either added together with the acid, or together with the polymer of one or more ethylenically unsaturated monomers.

When applied separately, the components can be applied in any form, e.g. in the form of strands, spraying, brushing or rolling.

The wooden materials can be any types of wooden material such as solid wood or wooden composites such as particle board materials.

The method preferably comprises gluing wooden lamellae forming a laminated beam. Laminated beams passing the test EN 391 B can be produced by the method according to the invention.

The amount applied of the adhesive system on the wooden surface, preferably a wooden lamella, is suitably from about 100 to about 1.000 g/m$^2$, preferably from about 200 to about 600 g/m$^2$.

The present invention further relates to a glued product obtainable by the method of the invention. The glued product is preferably a laminated beam.

The invention will now further be described in connection with the following examples which, however, not should be interpreted as limiting the scope of the invention.

EXAMPLES

Example 1

Tests of Different Acids

The following acids were tested as hardener components:

| | |
|---|---|
| glycolic acid | (aliphatic alpha hydroxy-monocarboxylic acid) |
| malic acid | (aliphatic alpha hydroxy-dicarboxylic acid) |
| lactic acid | (aliphatic alpha hydroxy-monocarboxylic acid) |
| tartaric acid | (aliphatic alpha hydroxy-monocarboxylic acid) |
| citric acid | (aliphatic alpha hydroxy-tricarboxylic acid) |
| mandelic acid | (aromatic alpha hydroxy-monocarboxylic acid) |
| formic acid | |
| maleic acid | |
| para-toluene sulphonic acid | |

Hardener compositions (Nos. 1-9) were made comprising 10.7 weight % acid, 16 weight % PvAc, 6 weight % polyvinyl alcohol and 67.3 weight % water. The PvAc was added as a dispersion comprising 50 weight % polymer. The polyvinyl alcohol had a degree of hydrolysis of 98.5% and a molecular weight of 75.000 g/mol. The hardener compositions made using para-toluenesulfonic acid (PTSA) and maleic acid were much less storage stable than the ones using the other acids and were not evaluated further.

Each hardener composition was combined with a melamine-urea-formaldehyde resin having 63 weight % dry content. The melamine-urea-formaldehyde resin and the hardener compositions were separately applied, in a mixing ratio of 1:1, on 90 cm×15.5 cm pieces of spruce and in an amount of 250 g/m$^2$. Thereafter laminates were formed from the pieces, the assembly time was 15 minutes, and the laminates were pressed at a temperature of 20° C., a pressure of 0.7-0.8 MPa for 2 hours. After 36 hours of after curing time the laminates were tested for delamination according to the EN 391 B standard test, which is a quite severe test.

The limits for "good" are defined as:

| | |
|---|---|
| Fiber tear: | ≧70% |
| Delamination: | ≦10% (all delamination results above 10% are equally bad) |

A storage stable hardener composition in the meaning of this invention is a hardener composition in which a polymer dispersion can be present without significantly being hydrolysed after 4 months storage, at 25° C.

The results are summarised in Table 1.

TABLE 1

| No. | Acid | pKa | Stability* of hardener | Fiber tear (%) | Delamination (%) | EN 391 B test | Summary |
|---|---|---|---|---|---|---|---|
| 1 | glycolic acid | 3.83 | ok | 90% | 1.5% | pass | very good |
| 2 | malic acid | 3.40 | ok | 81% | 5% | pass | very good |
| 3 | tartaric acid | 2.98 | ok | 70% | 5% | pass | good |
| 4 | lactic acid | 3.86 | ok | 86% | 8.5% | fail | good |
| 5 | citric acid | 3.13 | ok | 76% | 20% | fail | bad |
| 6 | mandelic acid | 3.41 | ok | 91% | 50% | fail | bad |

TABLE 1-continued

| No. | Acid | pKa | Stability* of hardener | Fiber tear (%) | Delamination (%) | EN 391 B test | Summary |
|---|---|---|---|---|---|---|---|
| 7 | maleic acid | 1.87 | bad | not tested | not tested | | |
| 8 | PTSA | −2.8 | bad | not tested | not tested | | |
| 9 | formic acid | 3.75 | ok | >90% | <1% | pass | very good |

*Storage stable for at least 1 month at 25° C.

No correlation to pKa could be seen.

Bonding results equal to the results of formic acid as hardening agent can be achieved.

The invention claimed is:

1. An adhesive system comprising a resin component which is an amino resin and a hardener component which is polyvinyl alcohol in an amount of from about 0.5 to about 25 weight % and an acid belonging to the group consisting of glycolic acid and malic acid.

2. The adhesive system according to claim 1, wherein the amino resin and the hardener component are separate components intended for combined use in methods of gluing wooden materials.

3. The adhesive system according to claim 1, which further comprises a polymer of one or more ethylenically unsaturated monomers.

4. The adhesive system according to claim 1, wherein the amino resin is a melamine-formaldehyde- or a melamine-urea-formaldehyde resin.

5. The adhesive system according to claim 1, which further comprises a divalent or trivalent alcohol.

* * * * *

UNITED STATES PATENT AND TRADEMARK OFFICE
CERTIFICATE OF CORRECTION

PATENT NO. : 8,410,204 B2
APPLICATION NO. : 12/667815
DATED : April 2, 2013
INVENTOR(S) : Ekblom et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 494 days.

Signed and Sealed this
First Day of September, 2015

Michelle K. Lee
*Director of the United States Patent and Trademark Office*